3,198,640
EXOTHERMIC COMPOSITION
John P. Walsh and Harold F. Bishop, Conneaut, Ohio, assignors to Exomet Incorporated, Conneaut, Ohio, a corporation of Ohio
No Drawing. Filed May 31, 1962, Ser. No. 198,739
4 Claims. (Cl. 106—38.3)

This invention relates to exothermic compositions, and has for its object the provision of an improved exothermic composition for use in various metallurgical operations. The improved exothermic composition of the invention may be used in the loose or bulk form but is particularly suitable for molding to produce riser sleeves, cores, hot tops, wall members for hot tops, pads and the like. The moldable compositions are provided as dry intimately mixed granular materials which are mixed with a small amount of water and a binder to form molded articles which may be used as molded, or baked in a manner similar to forming baked cores.

The common moldable exothermic compositions usually have been so proportioned as to have an insufficient amount of oxygen compounds to completely oxidize the aluminum and, accordingly, atmospheric oxygen is permitted to be absorbed as is necessary to complete the oxidation of the aluminum. Potassium fluoride and metal fluoborates have been used to react with the oxide film on the aluminum and produce a liquid phase which is removed to expose the aluminum for further oxidation.

The exothermic composition contains sodium silicate and can be molded and hardened in the $CO_2$ hardening process very advantageously.

The main advantages of the compositions listed herein are that oven-baking is not required in order to produce a hard refractory shape. After molding into the desired shape and the desired position in the mold, the exothermic composition can be treated with carbon dioxide gas which causes the material to harden into a hard rigid shape. When carbon dioxide gas contacts the sodium silicate it reacts to produce a silicic acid gel and sodium carbonate. The gel strongly bonds the composition particles together into a hard mass. It is preferred that the gassing be stopped short of complete reaction. If the composition is only partially gassed, it will develop sufficient strength to be hardened or to hold its shape. Thereafter, carbon dioxide from the air will complete the formation of the gel with a proportional increase in strength. Applicants recommend that a $CO_2$ gas pressure of 20 p.s.i. for a period of 10 to 20 seconds be used for the initial set. After remaining in the air for approximately 24 hours, the maximum strength in the composition will be developed; however, the composition may be used at any time after the initial gassing treatment. An over gassing treatment of the composition is to be avoided since this will tend to break the gel and reduce the strength.

The molded composition usually contains about 3% by weight of water which is about the moisture content of sand molds. The exothermic composition of our invention has a relatively high proportion of coarse particles resulting in porosity which permits easy egress of steam.

Our improved exothermic composition comprises relatively large aluminum particles, granular refractory material, an oxide of iron or dioxide of manganese or mixtures thereof, a small amount of a fluoborate or a fluoride such as potassium fluoride, and sodium chlorate, the said composition being thoroughly intermixed and in the form of a dry powder. The dry composition is mixed with water and sodium silicate binder to form a moldable composition. It is advantageous to use in our composition a metal fluoborate, in relatively small amount, for it decomposes during the exothermic reaction with the formation of compounds which react readily with aluminum oxide and effect its removal at lower temperatures and with a smaller amount of the compound than is required when using alkali metal fluorides. The metal fluoborates not only exercise their action in the removal of aluminum oxide film at a relatively low temperature but they reduce the amount of aluminum required in the composition. We may advantageously use fluoborates of sodium, potassium, calcium, barium, strontium, manganese, iron or zinc, the sodium, potassium and zinc compounds being preferred because of their lower capacity to absorb moisture, or zinc amino fluoborate. We prefer also to use crystalline metal fluoborates because they can be admixed in a dry pulverulent form with the other dry components of the compositions.

We have found that fine aluminum particles are not compatible with sodium silicate binders because silicates react with these materials during mixing to produce a heating effect. Sodium silicate being alkaline will react with the surface of aluminum particles. After this reaction occurs, the aluminum particles become passivated making them impervious to further reaction. With fine aluminum powder there is, of course, a very great surface area which permits an intense reaction of this type with the development of very high temperatures in the material. The heat developed will be of sufficient magnitude to completely dry out the exothermic material and cause it to cake, thereby making it unsuitable for use. It is advantageous to use relatively large aluminum particles, such as granular aluminum particles, or aluminum foil particles varying in size from —40 to 100 mesh screen. With the larger aluminum particles which are shown in the following examples, this heating reaction is minimized to such an extent that it is barely noticeable and will not harm the composition. Furthermore, moldable exothermic compositions have usually been made with nitrates of sodium or other alkaline metals and these are not compatible with sodium silicate and are avoided in the composition of this invention. We have found that sodium chlorate makes a compatible mixture producing good strength and good burning characteristics with no harmful side effects and is used in place of sodium nitrate.

The following examples illustrate moldable exothermic compositions of the invention:

Example I lists a range of the components of one type of exothermic composition

|  | Percent |
|---|---|
| Granular refractory | 20–50 |
| Aluminum | 24–35 |
| Iron oxide | 20–35 |
| Potassium fluoborate | .5–2.5 |
| Manganese dioxide | 1.0–10.0 |
| Sodium chlorate | .5–4.0 |

Example II lists a specific composition of the type of Example I

|   | Percent |
|---|---|
| Calamo 35 | 36.9 |
| Aluminum foil (−40 +100) | 19.8 |
| Aluminum, granular | 10.2 |
| Red iron oxide | 28.5 |
| Potassium fluoborate | 1.1 |
| Manganese dioxide | 2.4 |
| Sodium chlorate | 1.1 |

Example III lists a range of the components of another type of exothermic composition

|   | Percent |
|---|---|
| Granular refractory | 25–55 |
| Aluminum foil (−40 +100 mesh) | 25–40 |
| Potassium fluoborate | 1.5–3.5 |
| Manganese dioxide | 15–25 |
| Sodium chlorate | 1.0–4.0 |

Example IV lists a specific composition of the type of Example III

|   | Percent |
|---|---|
| Calamo 80 | 41.7 |
| Aluminum foil (−40 +100) | 34.2 |
| Potassium fluoborate | 2.6 |
| Manganese dioxide | 18.9 |
| Sodium chlorate | 2.5 |

In the above examples the granular refractory is an inert material such as alumina and silica or mixtures thereof. Although we may use any suitable refractory calcined clay, we prefer to use the clay known as Chamotte, sold under the name Calamo which consists of $Al_2O_3$ 35–50%, $SiO_2$ 40–60% and small amounts of other oxides. Calamo 30 is ground to produce a particle size range which is equivalent to an A.F.S. 30 grain fineness number. Calamo 80 is the same refractory ground to approximate an A.F.S. 80 grain fineness number.

In forming a molded article of the invention, the exothermic composition is mixed with about 3% by weight of water and from about 12 to 16% of sodium silicate which serves as a binder and can be used advantageously in the exothermic composition of the invention because it is compatible with sodium chlorate and the larger aluminum particles.

Compositions of the above types containing water and the sodium silicate can be mixed in any suitable manner, as in a Simpson, Clearfield, or Mulbarrow type sand muller for around 5 minutes. The material is then ready to be molded into any desired shape such as sleeves, cores, pads, etc. If it is desired to form a baked article, it is dried as in a recirculating type core oven at from 250° F. to 450° F. for about one hour per inch of thickness. For best results in regard to physical properties and exothermic efficiency the articles are baked at around 400° F. After baking, the articles can be stored in the same manner as regular sand cores.

When the molded article, for example a sleeve or core, is inserted into a mold and heated by the metal to approximately 2000° F. it will ignite and glow slowly for an appreciable length of time, producing within itself a temperature of over 3200° F. Because of the high percentage of non-fusible refractory and the amount of heat released the composition does not melt but retains substantially its original shape.

We claim:
1. The improved dry exothermic composition consisting essentially by weight: granular refractory material 20 to 55%, particulate aluminum 20 to 40%, iron oxide 20 to 35%, potassium fluoborate 0.5 to 3.5%, sodium silicate binder 12 to 16% and sodium chlorate 0.5 to 4.0%.
2. An exothermic composition as defined in claim 1 which includes from 1.0 to 25% of manganese dioxide.
3. A moldable exothermic composition as defined in claim 1 which comprises sodium silicate binder said particulate aluminum varying in particle size from −40 to 100 screen mesh.
4. The improved molded exothermic composition consisting essentially by weight: granular refractory material 20 to 55%, particulate aluminum 20 to 40% varying in particle size from −40 to 100 screen mesh, an oxide of the group consisting of iron oxide from 20 to 35% and manganese dioxide from 15 to 25%, sodium chlorate 0.5 to 4%, a binder consisting of silicic acid and sodium carbonate, and about 3% by weight of water.

References Cited by the Examiner

UNITED STATES PATENTS

| 2,490,327 | 12/49 | Soffel | 22—147 |
| 2,798,818 | 7/57 | Pletsch et al. | 22—147 |
| 3,077,646 | 2/63 | Tigerschiold | 22—147 |

FOREIGN PATENTS

| 744,720 | 2/56 | Great Britain. |
| 769,719 | 3/57 | Great Britain. |

WILLIAM J. STEPHENSON, *Primary Examiner.*
MARCUS U. LYONS, MICHAEL V. BRINDISI, *Examiners.*